(12) United States Patent (10) Patent No.: US 8,477,017 B2
Friedrich (45) Date of Patent: ***Jul. 2, 2013

(54) METHOD, SYSTEM, AND INTEGRATED CIRCUIT FOR COMMUNICATION IN RFID OR REMOTE SENSOR SYSTEMS

(75) Inventor: Ulrich Friedrich, Ellhofen (DE)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/290,545

(22) Filed: Nov. 7, 2011

(65) Prior Publication Data

US 2012/0126952 A1 May 24, 2012

Related U.S. Application Data

(63) Continuation of application No. 11/115,185, filed on Apr. 27, 2005, now Pat. No. 8,054,162.

(30) Foreign Application Priority Data

Apr. 28, 2004 (DE) .......................... 10 2004 020 956

(51) Int. Cl.
  *G08C 17/02* (2006.01)
(52) U.S. Cl.
  USPC ........................................................ 340/10.2
(58) Field of Classification Search
  USPC ................... 340/10.1, 10.2, 10.3, 10.34, 10.4,
    340/10.42, 10.5, 572.1, 572.3, 572.4, 3.21,
    340/928; 235/435, 384
  See application file for complete search history.

(56) References Cited

U.S. PATENT DOCUMENTS

| 5,365,551 | A | 11/1994 | Snodgrass et al. |
| 5,649,296 | A | 7/1997 | MacLellan et al. |
| 5,686,902 | A | 11/1997 | Reis et al. |
| 5,940,006 | A | 8/1999 | MacLellan et al. |
| 5,986,570 | A | 11/1999 | Black et al. |

(Continued)

FOREIGN PATENT DOCUMENTS

| EP | 1 172 755 A1 | 1/2002 |
| WO | 2004/029652 | 4/2004 |

OTHER PUBLICATIONS

Finkenzeller, Klaus, "RFID-Handbook;" Hanser 2002, 3rd Edition, pp. 203-224; ISBN 3-446-22071-2; Sections 7.2.4.1 and 7.2.4.2 (including an English version of the translated sections, which were translated in RFID Handbook: Fundementals and Applications in Contactless Smart Cards and Identification, Wiley, 2nd Edition, pp. 206-211; ISBN 0-470-84402-7), 2002.

*Primary Examiner* — Nabil Syed
(74) *Attorney, Agent, or Firm* — Baker Botts LLP

(57) ABSTRACT

In certain embodiments, a method may include receiving, at one of a plurality of remote units, a command from a control unit. The method may also include determining a random number specifying a time slot of a first series of time slots for transmitting a second data sequence to the control unit, and, in response to a determination that the random number specifies the first time slot in the first series of time slots, determining a new random number. The method may further include transmitting, in the first time slot in the first series of time slots, a first data sequence to the control unit. The method may further include receiving a control signal. The control signal having been transmitted by the control unit upon detection of an at least partially simultaneous transmission of first data sequences by more than one of the remote units.

20 Claims, 2 Drawing Sheets

U.S. PATENT DOCUMENTS

| | | |
|---|---|---|
| 6,039,244 A | 3/2000 | Finsterwald |
| 6,104,279 A | 8/2000 | Maletsky |
| 6,499,656 B1 | 12/2002 | Marsh et al. |
| 7,005,965 B2 | 2/2006 | Chen et al. |
| 2001/0043569 A1 | 11/2001 | Wood |
| 2002/0024422 A1 | 2/2002 | Turner et al. |
| 2005/0237156 A1* | 10/2005 | Scherabon .................. 340/10.2 |
| 2006/0163365 A1 | 7/2006 | Nakabe |

* cited by examiner

METHOD, SYSTEM, AND INTEGRATED CIRCUIT FOR COMMUNICATION IN RFID OR REMOTE SENSOR SYSTEMS

RELATED APPLICATIONS

This application is a continuation under 35 U.S.C. §120 of U.S. patent application Ser. No. 11/115,185 filed Apr. 27, 2005, entitled "Communication Method in RFID or Remote Sensor Systems," which will issue on Nov. 8, 2011 as U.S. Pat. No. 8,054,162 and claims the benefit under 35 U.S.C. 119(a) of German Patent Application No. DE 102004020956.1, filed in Germany on Apr. 28, 2004.

This nonprovisional application claims priority under 35 U.S.C. §119(a) on German Patent Application No. DE 102004020956.1, which was filed in Germany on Apr. 28, 2004, and which is herein incorporated by reference.

BACKGROUND OF THE INVENTION

1. Field of the Invention

The present invention relates to a method for communicating between a control unit and a number of remote units located in the response area of the control unit, for example, a base station and a number of tags in RFID or remote sensor systems, wherein the remote units are prompted to transmit a data sequence to the control unit in executing a command sent by the control unit.

2. Description of the Background Art

Today a wide variety of technical applications are known which use communication systems having at least one control unit or base station and a plurality of remote units arranged in a communication field about the control unit. In this context, the control unit is frequently capable of collecting information contained in the remote units; in addition, it can also be designed to write information in the remote units. The communication field can be composed of physical connections between the control unit and the remote units, or alternatively, can take the form of the transmissions of electromagnetic waves between the control unit and the remote units.

An example of the latter type of systems are radio frequency identification (RFID) systems, in which a control unit in the form of a base station (also known as a reader) transmits signals in the radio frequency range to remote units, which are primarily implemented as integrated circuits with a transmitting and receiving device (antenna) and are called transponders or tags. The tags can be used, in particular, as identification for objects, such as pieces of luggage, or for livestock, or people within the framework of access control. Moreover, when they are suitably designed, such tags can also perform sensor functions, for example temperature measurement, in which case they are typically called remote sensors.

In the aforementioned systems, data transmission from the tag to the base station can either take place with a time offset relative to the data transmission from the base station to the tag—in which case it is called a half-duplex transmission method (for example, Finkenzeller, RFID-Handbuch, 3rd edition (2002), Hanser, p. 40 ff, which was published in English by John Wiley & Sons, and corresponds to page 40 ff of the published English version—or it takes place in both directions at once, which is called full-duplex. For data transmission from the tag to the base station (return link), a so-called backscatter method is frequently used in this context, wherein the tag appropriately modulates and reflects back to the base station a carrier signal (carrier wave) of the base station, which in so-called passive tags can also serve to supply energy. A common modulation method is, for example, amplitude shift keying (ASK).

Within the scope of most of the above-mentioned applications, multiple remote units are present in the response area of the control unit, with the result that a transmission from the control unit is received by more than one remote unit. Hence an information query from the control unit can under certain circumstances result in a plurality of (simultaneous) transmissions from remote units to the control unit (known as multiple access), which generally disrupts or at least impedes reception by the control unit, especially when the remote units transmit with only very low useful signal strength, such as is the case with backscatter-based RFID systems.

To avoid these problems, a variety of anticollision or arbitration methods are known in RFID systems, the principles of which are explained in Finkenzeller, op. cit., pp 203 ff, which corresponds to pp 200 ff of the published English version and which is incorporated by reference herein. Such methods serve to permit the base station to sequentially select individual tags from among a plurality of tags and communicate selectively therewith. Upon conclusion of a communication with a tag (or a group of tags), the tag or tags are often muted until all tags have been addressed in this way without the aforementioned collision problems.

Another fundamental problem in the aforementioned communication systems is associated with the time period that must be calculated for reading information with a plurality of remote units, wherein efforts are frequently made to minimize the length of this time period.

A method is known from, for example, EP 1 172 755 A1, which corresponds to U.S. Publication No. 2002/0024422, and which is directed to reading information in a case of a plurality of transponders of an electronic identification system are operated in a half-duplex mode, in which a base station, upon successfully detecting a first part of a signal sequence transmitted by one of the transponders, transmits a control signal in the form of a notch signal (modulation dip, field gap) which mutes all transponders that are still inactive at that point in time, whereupon the base station uses an additional control signal to cause the transponder in question to transmit the remainder of the sequence. It must be viewed as a particular disadvantage here that an ASK-based backscatter transponder in particular must disable its RSSI channel (RSSI=receiver signal strength indicator) when operating its ASK modulator on account of overshoot problems caused by the occurrence of peaks during ASK modulation. Moreover it is necessary, especially with large transmission distances, to operate with a large modulation index m close to the value m=1 (known as on-off keying) so that the transponder then can no longer reliably determine whether the aforementioned notch signal comes from the base station or whether it was generated by the transponder itself to modulate the carrier signal.

Another disadvantage of the abovementioned, prior art solution consists in that the base station in any case destroys information by sending the notch signal, so that the described method can only be used in a reasonable manner with a modulation index m<1, since a backscatter signal can also occur during a notch here; however, this adversely affects the achievable range in consideration of the foregoing.

Also, in a conventional communication method, each of a number of remote units in the form of transponders first transmits certain header data to a control unit (base station) after a randomly determined time has elapsed, as is taught in, for example, U.S. Pat. No. 6,104,279. When the control unit receives such header data error-free, it can transmit a confirmation signal, which the relevant transponder interprets as a command to continue transmission, while the other transponders are automatically and simultaneously muted.

However, in the conventional art, there may be a statistically possible event of simultaneous transmission of header data by more than one transponder prior to reception of the confirmation signal, thus interference between the header data transmissions can occur, so that the process is delayed by the period of time corresponding to the length of the header data and the random period of time after which the next transponder transmits its header data.

SUMMARY OF THE INVENTION

It is therefore an object of the present invention to provide a method that is streamlined in its time sequence while also being reliable.

The object is attained by the invention with a method in that a control unit transmits a control signal to the remote units substantially simultaneously with the provided transmission of the data sequence as a function of a communication state, such as the absence of a transmission of the data sequence by at least one remote unit or an at least partially simultaneous transmission of the data sequence by more than one remote unit.

Accordingly, in accordance with the invention, the remote units are informed about a potentially unfavorable communication state simultaneously with the provided data transmission, i.e. in full duplex operation, so that the switchoff of the RSSI circuit necessary in prior art methods can be omitted. The control signal in accordance with the invention can be, for example, a notch signal, but for reliability reasons the modulation index m should be as large as possible, preferably m=1, such as in the case of double side band modulation (DSBM). However, the use of another command structure, in particular a short command structure (low bit count), is also possible, potentially in conjunction with protection with parity data or CRC data.

The method according to the invention can also be used together with a communication protocol such as the one disclosed in the aforementioned U.S. Pat. No. 6,104,279, which is incorporated by reference herein. According to U.S. Pat. No. 6,104,279, the tags each transmit a message to the base station starting from a randomly determined point in time. An inventive control signal during the first part of this message (called header data in U.S. Pat. No. 6,104,279) would cause the currently active tags to immediately stop their backscattering so that the base station then has a greater probability of receiving a later transmitting tag without interference. In addition, the control signal according to the invention can also cause the still inactive tags to count down their time delay counter (which begins with a random number as the starting value, for example).

The inventive solution can also be used with another prior art ALOHA method. In this case, a base station repeatedly sends a query, for example, by which means a random number stored in each of the tags located in the area is modified, e.g. counted down. Once a certain threshold value is reached in the counter in question, the tag in question transmits its message to the base station with the backscatter method, although collisions also occur here on account of statistical probabilities. In corresponding prior art methods, the base station must then wait until the end of the backscatter stream, which under certain circumstances contains the complete tag ID (RSSI disabled; see above). According to the invention, it is also possible with these and related methods for transmission of the control signal to cause all tags that are active at a given point in time to stop their transmission, whereupon all remaining tags automatically count down their individual timer. When this timer has reached its trigger threshold, for example the value zero, each of these tags automatically starts its transmission. In this way, another transmission of the query signal (often a notch signal) is avoided, with the simultaneous result that the noise level is also reduced, which improves the transmission quality and transmission reliability.

Accordingly, provision is made in a first further example embodiment of the inventive method—as already mentioned above—that the control signal causes an at least partially simultaneous data transmission by a plurality of remote units to be discontinued. Alternatively, the control signal can cause the control unit to stop waiting for a data transmission by the remote units, particularly when further provision is made that, during a predetermined time window, the control unit waits for transmission of the data sequence starting at a predetermined point in time. In other words, the remote units—or tags—may only begin to transmit data sequences at defined, synchronous points in time (slots) with the necessary synchronization of the tags being controlled by the base station. This is also known as the slotted ALOHA method (see Finkenzeller, op. cit., pp 212 ff, which corresponds to pp 208 if of the published English version, and which is incorporated by reference herein). Accordingly, therefore, the inventive control signal is only used when time windows or slots disadvantageously remain unoccupied (loss of time) or are multiply occupied (collision; see above), which contributes overall to accelerated communication and anticollision, and is expressed in a high tag/time unit rate.

For reliability reasons, the remote units, after receiving the command and before executing the same, each can transmit to the control unit reliability data, preferably CRC check data (CRC=cyclic redundancy check) calculated from the command data, including associated parameter values, and inverted. In this regard, provision can further be made that the control unit transmits to the relevant remote units a confirmation symbol and an end symbol (EOF=end of frame) on transmission of the reliability data, with at least one remote unit potentially being excluded by the confirmation symbol from executing the command. The confirmation symbol can be, for example, a logic "0" coded on the basis of predetermined time references (corresponding to a CRC bit accepted by the control unit) or a logic "0" [sic] (CRC bit not accepted), whereupon the unit in question is excluded from executing the command. The end symbol stops the calculation and transmission of reliability data and triggers execution of the command for the nonexcluded units.

Together with the command, the control unit preferably continues to transmit a maximum number of time windows (slots) intended for communication.

The remote units also can each transmit, as a data sequence, a random number that they determined and optional additional predetermined data from a data content of the remote unit in question, whereby the random number can specify the time window for the transmission of the data sequence by the remote unit in question, and whereby the length of the additional data can be controlled by the control unit.

In addition, all remote units, executing the command, can begin synchronously with a first transmission of the data sequence, so that the control unit can quickly establish whether a plurality of addressable units is in fact present in its area of influence. Consequently, the remote units whose random number corresponds to the time window of the common, first transmission, determine a new random number in order to subsequently be able to retransmit their data sequence. Thus, according to the invention each remote unit is active twice, namely in the course of the aforementioned first transmission, for example in the first slot, and in a second slot determined by the random number.

The data sequence can be terminated by the control signal during transmission of the random number, ensuring that no information is lost as a result of the termination signal. Moreover, a remote unit whose transmission is terminated in this way can determine a new random number by which the transmission slot is determined and subsequently retransmit a data sequence during the corresponding time window. Alternatively, the transmission of the data sequence can also be ended by the control signal during or after the transmission of the additional data.

In addition, provision can be made that a remote unit whose transmission was terminated is excluded from executing the command until the transmission of a new command by the control unit, reducing the risk of collision in the time window.

In order to further accelerate the inventive communication method relative to prior art methods, in particular conventional (slotted) ALOHA anticollision methods, provision can be made that, in the event that data transfer is absent during a time window, the process is immediately continued with the next time window.

Another example embodiment of the inventive method provides that, after terminating transmission, the control unit transmits an additional control symbol (a logic "0," a logic "1," or an end symbol), which then determines whether transmission of the additional data continues with a next data content of the remote unit or whether the transmission of the last data content of the remote unit is repeated. In this way, the additional control signal can be used for new synchronization of the transmission. Alternatively, on the basis of the additional control signal the transmission of the additional data can also be completely terminated, at least for the remote unit in question and for the current time step, so that the control unit is able to flexibly terminate a successive readout of memory contents (memory scroll) of the remote units at any time once it has received the desired data. This also means that a quantity of data to be read is not inherently limited when an auto-decrement of the memory address is used; the only limit here is set by the memory size.

When, as described above, the transmission of the additional data has been completely terminated on the basis of the additional control signal, at least for the remote unit in question and for the present time step, the reliability data for at least a part of the transmitted data, preferably CRC data, are then transmitted from the remote unit to the control unit, wherein the control unit:

checks the reliability data and in the event of a negative result transmits at least a first acknowledgement symbol, for example a logic "1", whereupon the remote unit is labeled as not identified; or checks the reliability data and in the event of a positive result transmits a second acknowledgement symbol, for example a logic "0", whereupon the remote unit is labeled as identified and is muted; or terminates the transmission of the reliability data by means of an end symbol, whereupon the remote unit is labeled as identified and awaits a new command.

Thus, according to the invention, the acknowledgment symbol for the reliability data or, respectively, the end symbol simultaneously can serve as an acknowledge symbol, thereby eliminating transmission of an additional acknowledge symbol that is generally provided in prior art methods for confirming large data transfers, in particular.

In order to then be able to continue quickly with a new time window for the purpose of streamlining the timing of the process, an advantageous further development of the invention is characterized in that, in the event of the first two alternatives listed above, the control unit subsequently transmits a time window control signal to begin a new time window. Likewise, in the event of the third alternative mentioned above, the control unit can terminate a new command that is to be transmitted and is expected by the remote unit by, for example, an end symbol and subsequently transmit a time window control signal to begin a new time window. In addition, the remote unit can be muted upon transmission of the time window control symbol in this context. In this way, the control unit can communicate with the selected remote unit in this time period, since the remote unit is first labeled as identified, i.e. is selected and is not muted until later.

In this context, the control unit preferably transmits an unmodulated carrier signal in the form of a continuous wave, which is recognized by the remote unit as a time window signal after the passage of a reference time period.

In a further example embodiment, according to which the acknowledgement symbol for the reliability data or the end symbol simultaneously serves as an acknowledge symbol so that the transmission of an additional acknowledge symbol can be eliminated, the initially stated object underlying the invention is also attained by a method of the initially mentioned type, in particular with the inclusion of one or more of the aforementioned embodiments, which method additionally is characterized in that, after termination of the transmission of the data sequence, reliability data on at least a part of the transmitted data are transmitted from the remote unit to the control unit and are checked there, and in that the control unit subsequently transmits to the remote unit a control signal based on the result of the check, by means of which control signal the remote unit is labeled either as identified or as not identified.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
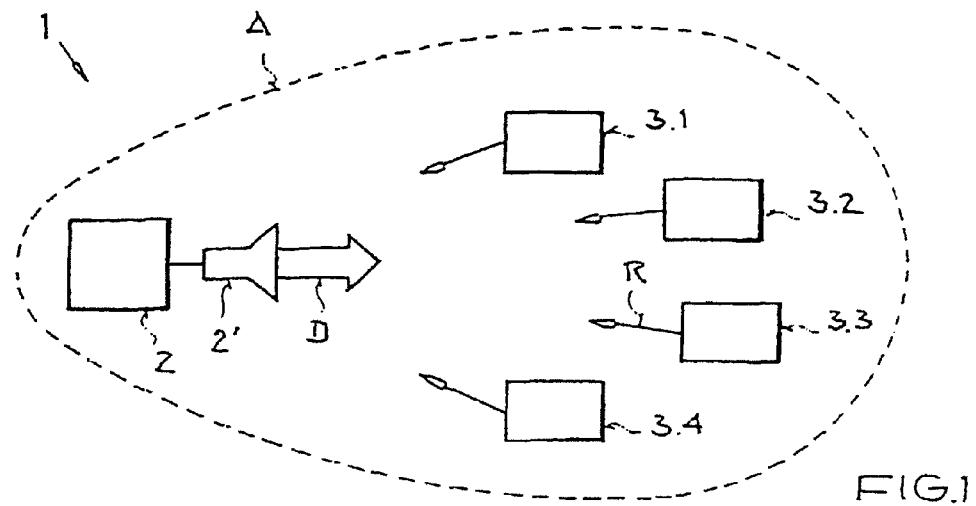
FIG. 1 is a schematic representation of an RFID system with a reader and a number of remote units (transponders or remote sensors) in the reader's response area.

FIG. 1 shows an RFID system 1 with a control unit in the form of a reader 2 (base station) in connection with suitable transmitting and receiving means 2', such as a dipole antenna, and a number of remote units (transponders 3.1-3.4), which are all located in a response area A of the reader 2.

In this situation, a data stream D transmitted by the reader 2 or the transmitting means 2' is received simultaneously by all transponders 3.1-3.4. The data transmission from the reader 2 to a transponder 3.1-3.4 is referred to below as forward link. The transponders 3.1-3.4 reply at least to a completed data transmission from the reader 2 through return links R, wherein a part of the energy received together with the data D at the transponder 3.1-3.4 is reflected (backscattered) and may be modulated for data transmission from the transponders 3.1-3.4 to the reader 2. When full-duplex-capable systems 1 are used in accordance with a preferred first embodiment of the inventive method, transmission in the forward and return links takes place simultaneously, i.e. data transmission to the reader 2 can also take place while the forward link is still in progress.

Although the material here and below mainly refers only to transponders, the present invention can of course also be used in systems with a number of remote sensors, possibly also in conjunction with a number of transponders.

Figure 2A:
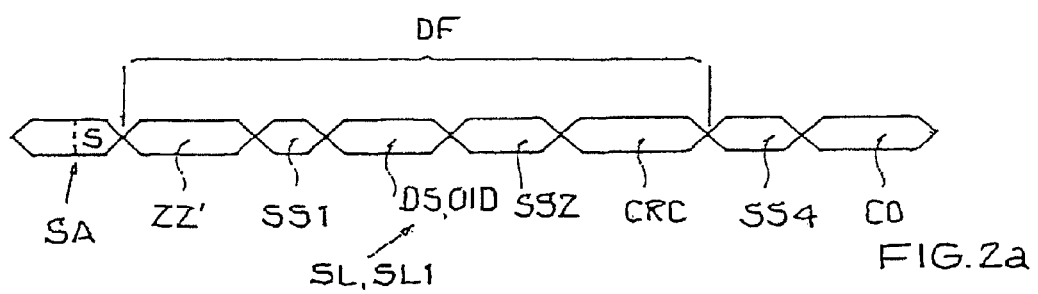
FIG. 2a illustrates a first data transmission sequence according to an example embodiment of the present invention.
Figure 2B:
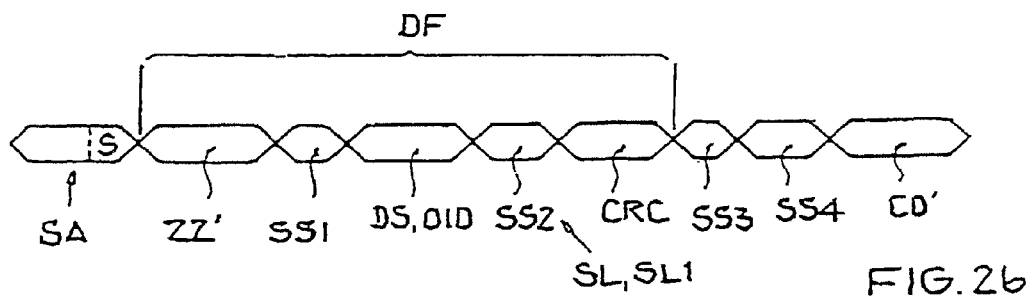
FIG. 2b illustrates a second data transmission sequence according to an example embodiment of the present invention.

FIGS. 2a and 2b schematically show a first and a second data transmission sequence between the base station 2 and a selected transponder 3.1-3.4 (FIG. 1) according to the inventive method in time sequence from left to right. As shown, the process begins in each case with a command SA ("set_a-loha") provided for this purpose, which can contain additional parameters, in particular a value S that defines a number of data transmission slots to be provided for communication of the transponders 3.1-3.4 with the base station 2.

The command SA prompts the transponders 3.1-3.4 to transmit a data sequence DF to the base station 2 in execution of the command. In addition, the transponders determine a random number ZZ, which stands for a slot (a time window) in which the transponder in question is to transmit, and store this random number in suitable storage means known to the practitioner of the art. The subsequent anticollision communication is based on a slot mechanism or time window mechanism controlled by the base station, wherein each transponder transmits (stored) data contents—by default an identification number OID—in "its" slot during the course of a so-called memory scroll, a run-through of its memory, for example in an auto-decrement process. In doing so, after starting the slot SL, the base station inserts control symbols SSn, n=1, 2, . . . into the scroll data sequence DF; if the system 1 has full-duplex capability, this also takes place simultaneously with the transmission by the corresponding transponder. For example, a control symbol SS1="0" ("0"=logic zero) stands for the next data content DS; if SS1="1" ("1"=logic one), the transponder repeats the last transmitted data content DS.

Upon reception of an end symbol SS2=REOF (return end of frame), the transponder transmits (inverted) CRC data CRC as reliability data. During the CRC transmission, the base station can transmit an acknowledge symbol SS3 (FIG. 2b), which either accepts a result of the CRC check by the base station and identifies the transponder in question, and possibly selects it for selective communication (SS3="0"), or rejects the CRC result and places the transponder into a waiting state until the next command SA (SS3="1"). The CRC area CRC is terminated with an end symbol SS4, which is equivalent to an acceptance of the CRC result if there is no preceding control symbol SS3 (FIG. 2a).

At the beginning of a slot SL, the transponder transmits a random number ZZ', preferably with a length of 8 bits, which in particular can be identical to the aforementioned random number ZZ. During this (transmission) time the base station can leave (skip) the slot SL by transmitting a control signal as described in greater detail below using FIG. 3, for example if no transponder answers the command from the base station or if transmissions from a plurality of transponders collide with one another in this time slot SL. After the transmission of the random number ZZ', there then follows the aforementioned transmission of data contents DS from the sole transponder that is "authorized to transmit" in this slot SL based on its random number ZZ.

In accordance with the invention, at the start of the first slot SL1 after issuance of the command SA, preferably all of the transponders 3.1-3.4 addressable by the base station 2 transmit at least one such random number ZZ' so the base station can determine in a simple manner whether any transponders at all are present in its response area A (FIG. 1).

If a transponder 3.1-3.4 should accidentally have calculated exactly the number of the first slot SL1 as the random number ZZ, then according to the invention it advantageously generates a new, different random number.

If the base station accepts the CRC data and thus confirms the data transmitted by the transponder (data contents DS, with random number ZZ' if applicable), the tag in question is labeled as identified (see also FIG. 4a) and thus subsequently can on the one hand be selectively addressed if applicable by an appropriate command CO (for data readout, programming, or the like), and on the other hand can be muted with regard to further communication between the base station and the remaining transponders, resulting in a reduction in the risk of collisions.

Upon rejection of the CRC data CRC by the base station (FIG. 2b), the transponder in question is labeled as not identified (see also FIG. 4b); a further command CO' can then follow immediately after an REOF symbol SS4 from the base station.

Since the transponders 3.1-3.4 are, as stated, preferably capable in accordance with the invention of being operated in full-duplex mode, they are able to receive a control signal such as a notch signal (modulation dip) from the base station 2 while they themselves are transmitting data to the latter. Thus, if the base station detects a collision during transmission of the random number ZZ', i.e. if more than one transponder with the same random number ZZ transmits in the same slot, then the base station for its part transmits the aforementioned control signal, which effects a skipping of this slot. All transponders that are active in this regard subsequently become quiet until a new "set_aloha" command SA occurs.

According to the invention, the control signal can, as stated, also be transmitted when no transponder transmits its random number within a slot, so as to be able to continue quickly with the next slot.

Figure 3:
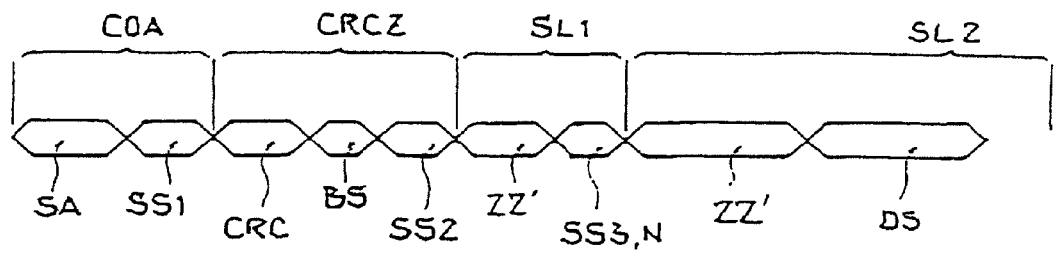
FIG. 3 illustrates another data transmission sequence according to a further example embodiment of the present invention.

The first variation of the two methods mentioned is shown in FIG. 3: in the command/argument zone COA, the base station transmits the command SA described above together with arguments (parameters) and terminates this transmission with a first control symbol SS1 in the form of an FEOF symbol (forward end of frame). This is followed by a reliability zone CRCZ, in which the transponder backscatters (inverted) CRC data CRC to the base station. The length of the CRC field is controlled by the base station in this context; the calculation of the CRC data is based on the data received by the transponder from the base station.

The base station then transmits at least one confirmation symbol BS to the transponder: according to the invention, BS="0" means that the base station accepts the CRC data CRC; in the case of BS="1," the base station does not accept the CRC data, and the transponder in question is excluded from executing the command SA. The confirmation symbol BS is followed by a second control symbol SS2, which terminates the CRC zone CRCZ, whereupon the transponder starts executing the correctly received command SA if applicable (BS="0," see above).

During the subsequent first slot SL1, each transponder, insofar as it is not excluded—as described above—from command execution, transmits an (8-bit) random number ZZ', followed if applicable by data contents DS of its memory such as an OID or other selected memory contents. This "complete" transmission is shown in FIG. 3 only for the slot SL2 in which, according to the invention, transmission is performed only by the transponder, whose random number ZZ (see above) is associated with the corresponding slot number.

In slot SL1, as a result of the (desired) collision occurring here during the transmission of the random number ZZ', the base station transmits a notch signal N as the third control symbol/control signal SS3, by which means the slot SL1 is exited and communication continues immediately with the slot SL2 already described. According to a first alternative embodiment of the method, transponders that are simultaneously active in the subsequent slots SLn can be shut down so that they are only allowed to participate in the communication again after the occurrence of a new "set_aloha" command SA. According to a second alternative, the transponders in question calculate a new random number ZZ and subsequently continue to participate in communication with the base station.

Via the notch signal N, the base station can also leave an "empty" slot in which no transponder has responded during a predetermined time period.

During the data transmission DS in slot SL2 in FIG. 3, a memory address of the transponder in question is decremented in scroll mode (see above) so that the length of the data is under the control of the base station. The base station can transmit a control symbol to terminate the data exchange with the transponder as shown in FIG. 4a and described below.

The upper portions of FIGS. 4a and 4b each show first an inventive data sequence for selecting a remote unit; indicated below this sequence in each case is the associated state (value) IDF over time of an identification flag in the transponder, wherein IDF=1 means that the flag is set, i.e. the transponder is selected, and IDF=0 correspondingly means that the transponder is not selected.

Figure 4A:
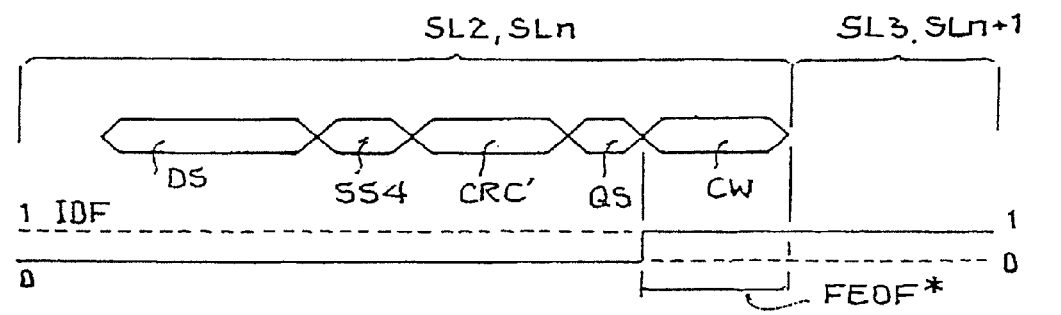
FIG. 4a illustrates a first data sequence for selecting a remote unit according to an example embodiment.
Figure 4B:
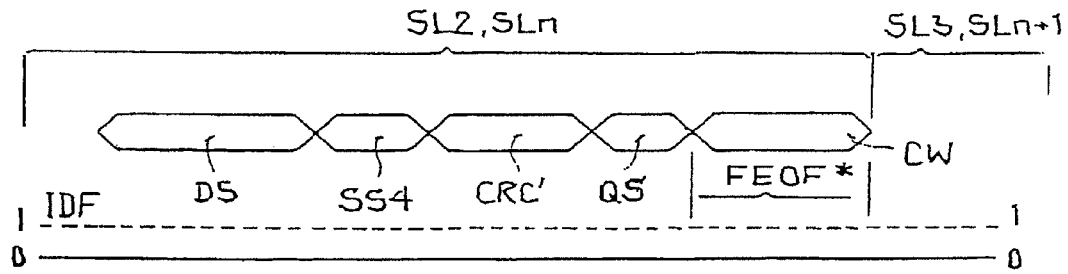
FIG. 4b illustrates a first data sequence for selecting a remote unit according to another example embodiment.

The upper portions of FIGS. 4a and 4b each show the continuation of the data transmission DS in slot SL2 (generalized as slot SLn) from FIG. 3. In order to terminate this transmission in a controlled manner, the base station transmits a control/end symbol SS4 in the form of an FEOF symbol, whereupon the transponder begins transmitting to the base station reliability data in the form of (inverted) CRC data CRC' for at least part of the scroll data transmitted, but preferably for all transmitted data. As shown in FIGS. 4a and 4b, the base station receives and checks the CRC data CRC' and then, on the basis of this check, transmits an acknowledgement symbol QS in the form of a "0" (accepted; FIG. 4a) or a "1" (rejected; FIG. 4b), as a function of which the flag IDF is set (FIG. 4a) or is not set (FIG. 4b). Additionally, in the case of accepted CRC data, the transponder in question is muted for further communication.

After the acknowledgement symbol QS, an unmodulated carrier wave CW from the base station, also referred to as a continuous wave, follows for a certain period of time. If this time reaches a threshold value FEOF*, this represents an end symbol FEOF, but without a notch signal having to be sent, which—as already mentioned—favorably affects the noise level. The next slot SL3, SLn+1, in which the random number is again transmitted first, starts immediately after such an EOF symbol.

When the base station terminates the CRC portion and if applicable the acknowledgement portion with an end symbol FEOF (not shown), IDF=1 is likewise set, and the transponder waits for a new command. If this portion is terminated with an FEOF symbol and a continuous wave CW in a manner similar to that described above, the next slot again begins after a time FEOF*; in this case, too, the transponder in question is muted for further communication. In this way, the base station can still communicate with the transponder in the time between the selection of the transponder (setting of the flag IDF) and its muting.

Figure 5:
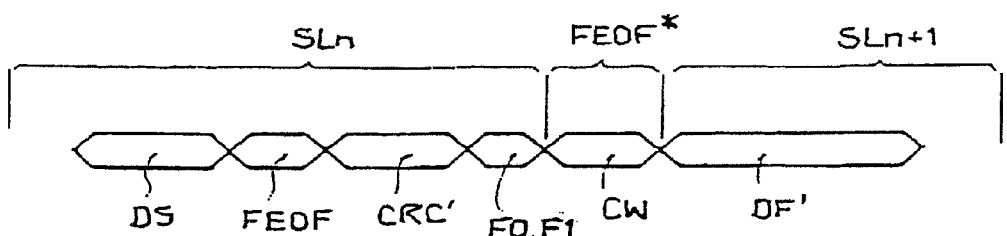
FIG. 5 illustrates a data sequence for starting a new time window according to an example embodiment of the present invention.

Finally, the above-described "switchover" from slot SLn to a new slot SLn+1 is described again using FIG. 5. Once the base station has terminated the transmission of CRC data CRC' with a control symbol in the form of a "0" (F0: forward "0") or a "1" (F1: forward "1"), it can transmit a continuous wave CW; the latter, as already described, also after an FEOF symbol followed by a new command and an additional concluding FEOF symbol (not shown). After the time FEOF* elapses, the next slot SLn+1 begins, which all potentially active transponders interpret as a "next_aloha" command, at which, according to the invention, the relevant transponder or transponders assigned to the new slot transmit a new data sequence DF' (see also FIGS. 2a and 2b) with leading random number.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method, comprising:
   receiving, at one of a plurality of remote units, a command from a control unit;
   in response to the command:
      determining a random number specifying a time slot of a first series of time slots for transmitting a second data sequence to the control unit;
      in response to a determination that the random number specifies the first time slot in the first series of time slots, determining a new random number;
      transmitting, in the first time slot in the first series of time slots, a first data sequence to the control unit; and
      receiving a control signal from the control unit, the control signal having been transmitted by the control unit upon detection of an at least partially simultaneous transmission of first data sequences by more than one of the remote units.

2. The method of claim 1, further comprising transmitting, in the time slot corresponding to the new random number in the first series of time slots, the second data sequence to the control unit.

3. The method of claim 2, further comprising receiving a second control signal from the control unit, the second control signal having been transmitted by the control unit upon detection of an at least partially simultaneous transmission of second data sequences by more than one of the remote units.

4. The method of claim 3, wherein the second control signal causes the at least partially simultaneous data transmission of second data sequences to be discontinued.

5. The method of claim 1, further comprising receiving a second control signal from the control unit, the second control signal having been transmitted by the control unit upon detection of an absence of a transmission of a second data sequence during one of the time slots in the first series of time slots.

6. The method of claim 5, wherein the second control signal immediately starts a subsequent time slot in the first series of time slots.

7. The method of claim 1, wherein the control signal causes the at least partially simultaneous data transmission of first data sequences to be discontinued.

8. The method of claim 1, wherein the control signal is received substantially simultaneously with the transmission of the first data sequence.

9. A system, comprising:
a transmitting/receiving device operable to receive a command from a control unit; and
an integrated circuit operable to:
determine a random number specifying a time slot of a first series of time slots for transmitting a second data sequence to the control unit; and
in response to a determination that the random number specifies the first time slot in the first series of time slots, determine a new random number;
wherein the transmitting/receiving device is further operable to:
transmit, in the first time slot in the first series of time slots, a first data sequence to the control unit; and
receive a control signal from the control unit, the control signal having been transmitted by the control unit upon detection of an at least partially simultaneous transmission of first data sequences by more than one of a plurality of systems.

10. The system of claim 9, wherein the transmitting/receiving device is further operable to transmit, in the time slot corresponding to the new random number in the first series of time slots, the second data sequence to the control unit.

11. The system of claim 10, wherein the transmitting/receiving device is further operable to receive a second control signal from the control unit, the second control signal having been transmitted by the control unit upon detection of an at least partially simultaneous transmission of second data sequences by more than one of the plurality of systems.

12. The system of claim 11, wherein the second control signal causes the at least partially simultaneous data transmission of second data sequences to be discontinued.

13. The system of claim 9, wherein the transmitting/receiving device is further operable to receive a second control signal from the control unit, the second control signal having been transmitted by the control unit upon detection of an absence of a transmission of a second data sequence during one of the time slots in the first series of time slots.

14. The system of claim 13, wherein the second control signal immediately starts a subsequent time slot in the first series of time slots.

15. The system of claim 9, wherein the control signal causes the at least partially simultaneous data transmission of first data sequences to be discontinued.

16. The system of claim 9, wherein the control signal is received substantially simultaneously with the transmission of the first data sequence.

17. An integrated circuit operable, upon receiving a command from a control unit, to:
determine a random number specifying a time slot of a first series of time slots for transmitting a second data sequence to the control unit;
in response to a determination that the random number specifies the first time slot in the first series of time slots, determine a new random number;
generate a first data sequence for transmittal, in the first time slot in the first series of time slots, to the control unit; and
receive a control signal from the control unit, the control signal having been transmitted by the control unit upon detection of an at least partially simultaneous transmission of first data sequences by more than one of a plurality of integrated circuits.

18. The integrated circuit of claim 17, wherein the integrated circuit is further operable, upon receiving the command from the control unit, to generate the second data sequence for transmittal, in the time slot corresponding to the new random number in the first series of time slots, to the control unit.

19. The integrated circuit of claim 18, wherein the integrated circuit is further operable, upon receiving the command from the control unit, to receive a second control signal from the control unit, the second control signal having been transmitted by the control unit upon detection of an at least partially simultaneous transmission of second data sequences by more than one of the plurality of integrated circuits.

20. The integrated circuit of claim 17, wherein the integrated circuit is further operable, upon receiving the command from the control unit, to receive a second control signal from the control unit, the second control signal having been transmitted by the control unit upon detection of an absence of a transmission of a second data sequence during one of the time slots in the first series of time slots.

* * * * *